US008402227B2

(12) United States Patent
Moir et al.

(10) Patent No.: US 8,402,227 B2
(45) Date of Patent: Mar. 19, 2013

(54) SYSTEM AND METHOD FOR COMMITTING RESULTS OF A SOFTWARE TRANSACTION USING A HARDWARE TRANSACTION

(75) Inventors: Mark S. Moir, Windham, NH (US); Yosef Lev, New York, NY (US); Daniel S. Nussbaum, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 372 days.

(21) Appl. No.: 12/750,908

(22) Filed: Mar. 31, 2010

(65) Prior Publication Data
US 2011/0246725 A1    Oct. 6, 2011

(51) Int. Cl.
G06F 12/00 (2006.01)
G06F 9/46 (2006.01)

(52) U.S. Cl. ........................................ 711/147; 718/101
(58) Field of Classification Search .................... None
See application file for complete search history.

(56) References Cited

U.S. PATENT DOCUMENTS

| | | | |
|---|---|---|---|
| 7,395,382 B1 | 7/2008 | Moir | |
| 7,870,545 B2 * | 1/2011 | Saha et al. | 717/159 |
| 2006/0085591 A1 | 4/2006 | Kumar et al. | |
| 2007/0186056 A1 * | 8/2007 | Saha et al. | 711/144 |
| 2007/0198519 A1 * | 8/2007 | Dice et al. | 707/8 |
| 2009/0172299 A1 | 7/2009 | Goodman | |
| 2009/0172306 A1 * | 7/2009 | Nussbaum et al. | 711/154 |
| 2009/0282386 A1 * | 11/2009 | Moir et al. | 717/106 |
| 2009/0282405 A1 * | 11/2009 | Moir et al. | 718/100 |
| 2011/0067014 A1 * | 3/2011 | Song et al. | 717/149 |
| 2011/0099335 A1 * | 4/2011 | Scott et al. | 711/141 |
| 2011/0125973 A1 * | 5/2011 | Lev et al. | 711/153 |
| 2011/0145637 A1 * | 6/2011 | Gray et al. | 714/15 |
| 2011/0145802 A1 * | 6/2011 | Levanoni et al. | 717/151 |

OTHER PUBLICATIONS

Yosef Lev and Mark Moir and Dan Nussbaum (Aug. 2007). PhTM: Phased Transactional Memory. TRANSACT~'07: 2nd Workshop on Transactional Computing, 11 pages.
Yossi Lev, Victor Luchangco, Virendra Marathe, Mark Moir, Dan Nussbaum, Marek Olszewski. Anatomy of a scalable software transactional memory. TRANSACT 2009: The 4th ACM SIGPLAN Workshop on Transactional Computing.

* cited by examiner

Primary Examiner — Kaushikkumar Patel
(74) Attorney, Agent, or Firm — Robert C. Kowert; Meyertons, Hood, Kivlin, Kowert & Goetzel, P.C.

(57) ABSTRACT

The system and methods described herein may exploit hardware transactional memory to improve the performance of a software or hybrid transactional memory implementation, even when an entire user transaction cannot be executed within a hardware transaction. The user code of an atomic transaction may be executed within a software transaction, which may collect read and write sets and/or other information about the atomic transaction. A single hardware transaction may be used to commit the atomic transaction by validating the transaction's read set and applying the effects of the user code to memory, reducing the overhead associated with commitment of software transactions. Because the hardware transaction code is carefully controlled, it may be less likely to fail to commit. Various remedial actions may be taken before retrying hardware transactions following some failures. If a transaction exceeds the constraints of the hardware, it may be committed by the software transactional memory alone.

20 Claims, 7 Drawing Sheets

SYSTEM AND METHOD FOR COMMITTING RESULTS OF A SOFTWARE TRANSACTION USING A HARDWARE TRANSACTION

BACKGROUND

1. Field of the Disclosure

This disclosure relates generally to concurrent access to shared objects, and more particularly to a system and method for implementing a transactional memory that exploits hardware transactions to validate and/or commit results of software transactions, in some cases.

2. Description of the Related Art

The multi-core revolution currently in progress is making it increasingly important for applications to exploit concurrent execution in order to take advantage of advances in technology. Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Such assurances are important for practical and productive software development because without them, it can be extremely difficult to manage the interactions of concurrent threads. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, priority inversions, software complexity, and performance limitations. Locking large sections of code and/or code that accesses a lot of data is a heavy-handed approach to concurrency control.

Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, it may be difficult (if not impossible) and cumbersome to generate code such that interleaved executions are guaranteed to be correct, i.e. that critical sections do not access memory locations in common.

Transactional memory is a mechanism that can be leveraged to enable concurrent and correct execution of a critical section by multiple threads. Transactional memory allows a thread to execute a block of instructions either completely and atomically or not at all. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or to be aborted, such that they have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs. In general, transactional memory can be implemented in hardware (HTM), in software (STM), as a hybrid transactional memory system (HyTM), or as a phased transactional memory system (PhTM). In HyTM and PhTM systems, the transactional memory employs hardware transactions for implementing some atomic transactions and employs software transactions for others.

Typically, a significant part of the overhead of committing a software transaction is due to the number of expensive synchronization operations (e.g., compare-and-swap type operations) that are performed in order to acquire ownership of locations to be written, and/or to increment committing indicators and subsequently decrement those indicators after completing a write back operation for the transaction. Some current HyTM and PhTM systems attempt to execute user transactions using hardware transactions. If a hardware transaction fails, one of these systems might retry it using hardware, but if it keeps failing, the system eventually resorts to the use of software transactions, which is much more expensive. Some HyTM or PhTM systems include so-called "best-effort HTM" (BEHTM), which is not required to commit all possible transactions, but which can simply abort a transaction in response to attempts to execute unsupported instructions or commit transactions under difficult scenarios and events, or when hardware resources are exhausted. In such systems, when and if they switch from using a hardware transaction to using a software transaction to execute a user transaction, the entire user transaction is performed within a software transaction. In other words, such systems either execute the entire transaction (including the user code) as a hardware transaction or execute the entire transaction in software.

SUMMARY

The system and methods described herein may in some embodiments exploit hardware transactional memory (HTM) to improve the performance of a software transactional memory (STM) or hybrid transactional memory (HyTM) implementation, even when an entire user transaction (e.g., as expressed in an atomic block) cannot be executed within a hardware transaction. For example, in some embodiments the user code of an atomic transaction may be executed within a software transaction, and the software transactional memory implementation may collect read and write sets and/or other information about the atomic transaction. A single hardware transaction may then be employed to atomically apply the effects of the user code of the atomic transaction based on the information captured by software transactional memory. The hardware transaction may atomically validate the read set of the transaction and apply the effects of the user code to memory.

In some embodiments, using a hardware transaction to commit results of an atomic transaction for which the user code was executed by software transactional memory may reduce the overhead typically associated with commitment of software transactions. Because the hardware transaction code is carefully controlled, it may be less likely to fail to commit than a transaction comprising arbitrary user code. In addition, because the hardware transaction code is known, it may possible to take remedial action to improve the odds that it will succeed before attempting to commit the transaction and/or before retrying the transaction following a failure to commit the transaction, depending on the reason for the failure.

The system described herein may not depend on the ability to commit every transaction using a hardware transaction. For example, in some embodiments, if an atomic transaction exceeds the limitations of the hardware transactional memory, it may be committed by the software transactional memory alone. In some embodiments, if the atomic transaction exceeds the limitations of the hardware transactional memory (e.g., if it includes more entries in its write set than are supported by the hardware transactional memory implementation), the commit operation may be divided into multiple hardware transactions. In systems that include unbounded hardware transactional memory, the methods described herein may be simplified.

The system and methods described herein may in various embodiments support any combination of visible reads, invisible reads, and/or semi-visible reads, and/or may employ value-based read validation, as described herein. The system may also support implicit privatization, in some embodiments.

Figure 1:
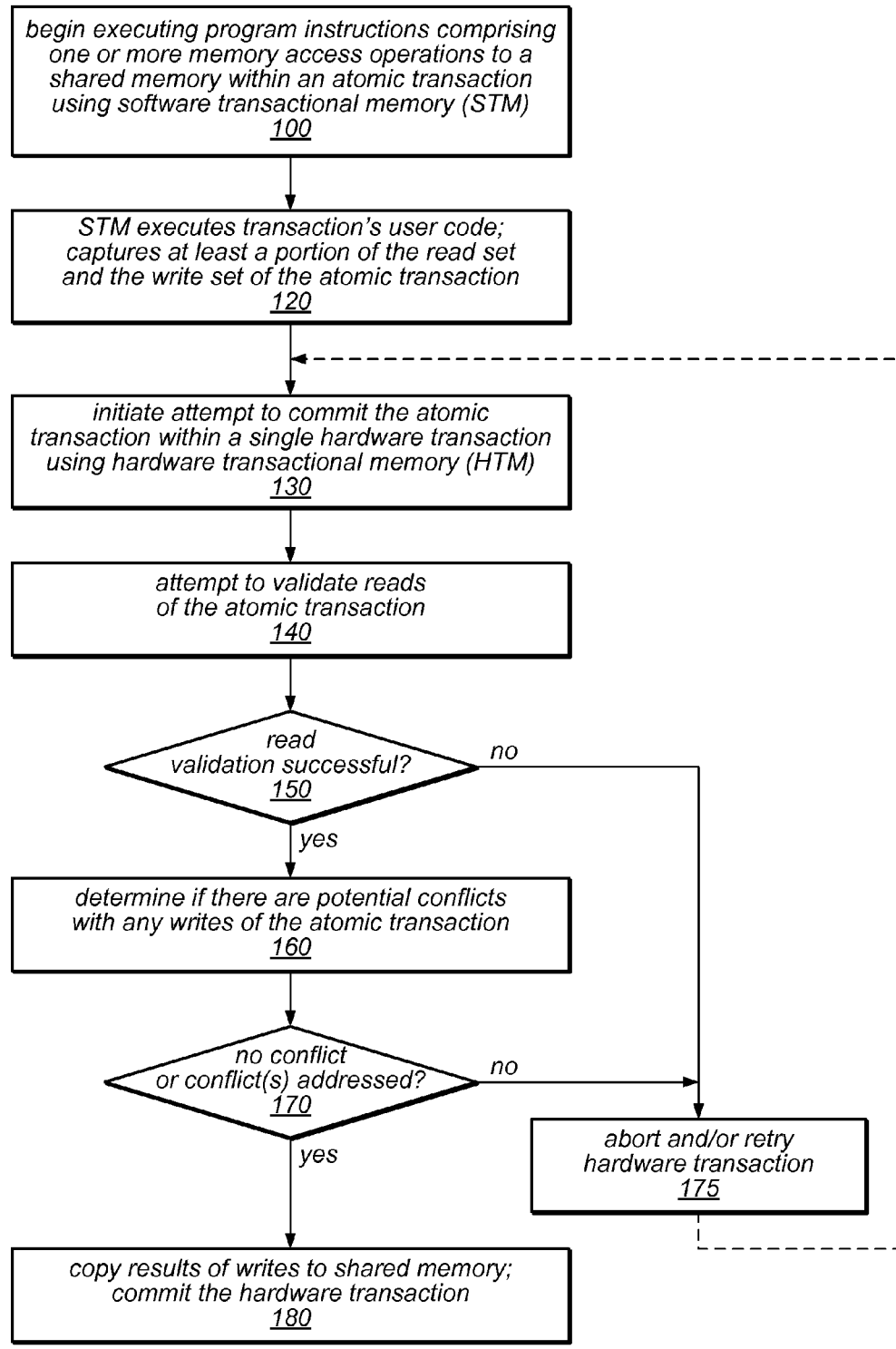
FIG. 1 is a flow diagram illustrating one embodiment of a method for exploiting hardware transactional memory (HTM) in a software or hybrid transactional memory system, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The system and methods described herein may in some embodiments exploit hardware transactional memory (HTM) to improve the performance of a software transactional memory (STM) or hybrid transactional memory (HyTM) implementation, even when an entire user transaction cannot be executed within a hardware transaction. For example, in some embodiments the system may include mechanisms to support both HTM and STM implementations for executing code as an atomic transaction. In some such embodiments, user code to be completed as an atomic transaction may be executed within a software transaction, and the software transactional memory implementation may collect read and write sets and/or other information about the atomic transaction. A hardware transaction may then be employed to atomically apply the effects of the user transaction based on the information captured by the software transactional memory.

As used herein, the term transaction may refer to a series of program instructions that may be executed together as an atomic operation. If the transaction succeeds (i.e. is successfully committed), then any resulting changes to shared memory may become visible to entities other than the actor. If a transaction does not succeed (i.e. is aborted), then the transaction attempt will have caused no change to any shared memory location. As described herein, read validation is a process by which software transactions check for consistency of the data with which they are executing, i.e. consistency between data read from a shared memory during execution of a given transaction. In various embodiments, different read validation techniques may be used to ensure that all reads remain consistent with one another while a transaction is executing, therefore preventing the transaction from performing erroneous operations (e.g., operations that cannot be undone) that would otherwise be impossible if executing atomically.

Traditionally, because validation must be performed after each read, it may represent a significant cost of the overall execution time of a software transaction. Various read ownership methods may be used for validating reads in a software transactional memory (STM), including invisible, visible, or semi-visible read ownership methods. With an invisible read validation technique, a transaction may maintain per-location metadata (which may be referred to as a snapshot) that can be checked to see whether a memory location that has been read by the transaction has or has not been subsequently written to. When applying an invisible read validation technique, after every read, a transaction may iterate over its entire set of snapshots to determine whether all prior reads are still valid, i.e. that no data read by the transaction has changed since it was read. Since invisible read validation does not require that an executing thread communicate its read locations to other threads, an invisible read validation strategy may be scalable (i.e. it may be scalable for use with any number of threads). However, repeatedly iterating over the transaction's entire read set (i.e. its snapshots) may incur an overhead that is quadratic in time with respect to the number of entries in the read set, precluding the applicability of an invisible read validation technique to workloads that include large transactions. Note that while it may be possible to reduce this complexity by various central synchronization mechanisms that sacrifice scalability, such solutions may be even less desirable (i.e. more costly than the techniques they are meant to replace).

With a visible read validation technique, each transaction may indicate to all other transactions that it has read a memory location, allowing other transactions wishing to write to that location to identify and abort such readers. For example, each reader may "register" for each memory location that it reads, and a writing transaction may access this registration information and abort any registered readers. While this approach may dramatically reduce (or virtually eliminate) the cost of validation, the communication required for transactions to announce what memory they have read may be expensive. In addition, this technique may not scale well, especially in the presence of read sharing, where multiple transactions concurrently read the same location.

With a semi-visible read validation technique, a transaction that wishes to write to a memory location may be able to determine whether any other transaction is reading the location, but not which transaction(s) are reading the location. By applying a semi-visible read validation technique, the system may be configured to determine when writers conflict with readers, and to avoid expensive read set validation as long as no writer-reader conflicts have occurred.

Note that if there is contention between transactions, such as if one transaction attempts to read or write to a memory location that is owned for writing by another transaction, the system may be configured to abort the current transaction (i.e. the transaction attempting to perform a read or write access operation), the current transaction may abort the transaction that owns the memory location for writing, and/or the current transaction may steal ownership of the memory location, e.g., according to a contention management policy or at the direction of a contention manager, in various embodiments.

In various embodiments, a transaction may be said to own a location either for reading or for writing. In some embodiments, write ownership may be exclusive to one transaction at a time, while read ownership may be shared between multiple transactions. In some embodiments, a data structure (e.g., an ownership record) may be associated with one or more locations in a shared memory, and may include an indication of whether the one or more locations are owned for reading and/or writing, along with other information (i.e. metadata) used to manage concurrent read and/or write accesses to those locations. Various examples of such data structures (and their uses in read validation) are described herein, according to different embodiments.

In some embodiments, to reduce overhead typically associated with read set validation, when employing semi-visible reads the system may increment a global read-write conflict counter when a writing transaction that conflicts with a reader commits. In such embodiments, there may be no need for a transaction to perform a full validation of its read set if the read-write conflict counter value has not changed since the last time the read set was known to be valid (e.g., at the beginning of the transaction). Using a compare-and-swap (CAS) type operation (or another suitable atomic read-modify-write operation) to increment a global read-write conflict counter may in some embodiments allow the writing transaction to simultaneously increment the counter and confirm that the counter has not changed, and thus to effect read validation. In the case that the counter has changed, the writing transaction may perform a full read set validation in addition to incrementing the global read-write conflict counter.

As noted above, with a semi-visible read validation technique, a transaction that wishes to write to a memory location may be able to determine whether any other transactions are reading the location, but not which transaction(s). In some embodiments, this may be accomplished by having reading transactions update metadata associated with each memory location on every read, e.g., a counter, or a scalable data construct such as a scalable non-zero indicator (SNZI), which indicates only whether a corresponding count value is zero or non-zero and not any specific non-zero values. Updating such metadata may be referred to as acquiring or releasing an ownership record (or orec) for reading. In such embodiments, writing transactions may check this metadata to determine whether they conflict with readers, and may maintain a counter that is incremented whenever such a conflict occurs. With care, a transaction may avoid an expensive full-read-set validation in the vast majority of cases by checking the counter to see whether any writer-reader conflicts have occurred during its execution. In various embodiments, the counter is updated only when there are writer-reader conflicts, and thus does not impede scalability when no conflicts occur. However, this approach may incur a significant overhead (in terms of latency) due to the cost of the synchronization operations required to acquire and release read ownership of the orecs associated with each location read. For example, in some embodiments, at least two synchronization operations (e.g. CAS type operations) may be performed per orec acquired for reading, and more synchronization operations may be performed if the metadata becomes contended (e.g., due to read sharing) or if implicit privatization is supported. With implicit privatization, a thread may use a transaction to "isolate" a shared chunk of memory so that no other thread should be able to access it (e.g., by setting all shared references to that memory chunk to NULL), and thereafter (non-transactionally) operate on that memory as though it were private.

As noted above, the system and methods described herein may in some embodiments exploit hardware transactional memory to improve the performance of a software transactional memory, even when an entire user transaction cannot be executed within a hardware transaction. User code within an atomic transaction may include any arbitrary code or computations, some of which may not be executable within a hardware transaction, or which may significantly reduce the likelihood of success of a hardware transaction within which it is executed. For example, arbitrary user code may include illegal computations, or accesses to I/O or illegal addresses, or may be vulnerable to various types of errors or behavior causing exceptions that would lead to a failure to commit results of the user code as an atomic transaction by a hardware transactional memory.

In one example, a user transaction may access a first memory location, perform a long computation, and then access another memory location before committing. If this user code were to be executed within a hardware transaction, during the long computation, the hardware transaction could be vulnerable to conflicts with other accesses to the first memory location, i.e. the location accessed early in the transaction. In some systems, these may include "false conflicts", e.g., because conflicts may be detected at the granularity of a cache line. In other words, if another location in the same cache line as the first memory location is accessed, it may cause the hardware transaction to fail, even though there is not an actual conflict with the first memory location. In some systems, depending on the particular HTM implementation, hardware transactions may be vulnerable to events that are unrelated to the user code itself. For example, a timer interrupt may be more likely to occur during a lengthy transaction, regardless of what the transaction is doing. In some HTM implementations, such a timer interrupt may cause a transaction to fail. Some HTM implementations (including various BEHTM implementations) may exhibit other idiosyncrasies that make them significantly more likely to fail when attempting to execute unconstrained, dynamic user code as an atomic transaction than when executing carefully controlled system code as an atomic transaction.

In some embodiments, the system described herein may allow the code that is executed within a hardware transaction to be carefully controlled, increasing the likelihood that the hardware transaction succeeds. For example, in some embodiments, the code to be run within the hardware transaction itself may be specified or even produced by the designers who implemented the transactional memory for the system (e.g., the software transactional memory and/or the hardware transactional memory), as part of the implementation of the system. In other embodiments, the code within the hardware transaction may be produced by operating system code or other system-level code designed to be compatible with the available software transactional memory and/or hardware transactional memory in the system. In some embodiments, the code executed in the hardware transaction may be controlled such that it does not include code that is likely (or certain) to cause a hardware transaction executing it to abort. For example, in one embodiment, the processor may not support divide instructions within hardware transactions. In addition, because the system may have knowledge of the contents of the hardware transaction, in some embodiments there may exist an opportunity to perform preparatory or remedial actions to improve the chances of success, such as pre-loading (sometimes referred to as "warming") caches and/or TLB structures prior to initiating an attempt to commit a user transaction using a hardware transaction or in response to a failed attempt to commit a user transaction using a hardware transaction.

In some embodiments, the execution of the user code of an atomic transaction may be separated from the execution of operations that attempt to commit the results of the atomic transaction, and only the operations required to commit the results may be executed within a hardware transaction. As noted above, in such embodiments the operations to be executed within the hardware transaction may not be an arbitrary collection of user code or computations, but may be operations known to and controlled by the system. In such embodiments, the user code of the atomic transaction may be executed within a software transaction, which may employ one or more memory barriers and/or collect information about its read set and write set, but which may not need to support or provide much, if any, conflict detection. Assuming the user code is successfully executed within the software transaction (e.g., if it does not contain any illegal operations or accesses, is not aborted by another concurrently executing process that detects a conflict, and is not disrupted by an interrupt or other exception), all the information needed for the commit operation may be collected by the software transaction (e.g., the read and write sets). In some embodiments, the system may be configured to synthesize this information about what was read and what is to be written by the atomic transaction into a hardware transaction that includes only carefully controlled code, i.e. only the code needed to atomically apply the effects of the user transaction.

Note that separating out the user code from the commit operations of an atomic transaction may not guarantee that the atomic transaction succeeds. For example, in some cases the transaction may be aborted (either during execution of the user code by the software transactional memory or during an attempt to commit the results of the user code by the hardware transactional memory) due to a conflict with another concurrently executing transaction, or may fail for some other reason (e.g., due to an interrupt or other exception), and may need to be retried. In some embodiments, if an attempt to commit an atomic transaction using a hardware transaction fails, the attempt may be retried (e.g., using another hardware transaction). In some embodiments, if an atomic transaction fails to commit using a hardware transaction (or if it fails to commit using a hardware transaction more than a pre-determined number of times), it may be retried without employing a hardware transaction, i.e. by employing the software transactional memory to attempt to execute the entire atomic transaction, including the commit phase.

Note that because the operations required to commit results of an atomic transaction are known, the system may in some embodiments be configured to determine whether or not these operations are likely to be successfully executed within a hardware transaction. For example, the system may be configured to determine whether the required operations exceed the limits of the hardware transactional memory (e.g., if more write operations are needed to commit the results of the atomic transaction than the number supported by the particular hardware transactional memory implementation). In some embodiments, the system may be configured to attempt to commit results of an atomic transaction (for which the user code has been executed within a software transaction) using a hardware transaction only if the hardware transaction is likely to be successful (e.g., if it meets the criteria imposed by any limitations or constraints of the hardware transactional memory implementation). If a hardware transaction to commit results of an atomic transaction is not likely to succeed, the system may employ software transactional memory to attempt to execute the entire atomic transaction, including the commit phase. In some embodiments, if a hardware transaction to commit results of an atomic transaction is not likely to succeed because it exceeds the hardware resources of the hardware transactional memory, remedial action may be taken to divide up acquisition of ownership for locations in the write set of the atomic transaction into separate transactions, as described in more detail below.

As previously noted, because the operations required to commit results of an atomic transaction are known and because the system has control over the operations included in a hardware transaction to commit results of an atomic transaction, the system may in some embodiments be configured to determine and implement one or more remedial actions that may be taken to improve the chances that such a hardware transaction succeeds following a failed attempt (e.g., upon being retried). For example, if an attempt to commit an atomic transaction using a hardware transaction fails, the system may be configured to determine if there were any issues due to TLB misses. If so, the system may be configured to pre-load the TLB with any needed translations for locations to be accessed by the transaction, and may thus avoid a TLB miss upon retrying the transaction. In another example, the code to be executed within a hardware transaction in an attempt to commit results of a user transaction may be constructed such that branches are predicted correctly most of the time, e.g., based on the results of any previous attempts to commit the transaction and/or on other historical or system data available to the transactional memory system.

As described below, committing a user transaction using a single hardware transaction to apply the effects of the transaction to memory may in some embodiments reduce or eliminate one or more sources of significant overhead typically incurred in the commit phase of a software-only transaction (or in software-only transactions executed within a HyTM system). For example, when a hardware transaction is employed in the commit phase, the hardware transaction may not acquire ownership of the orecs associated with memory locations written by the user transaction. This may result in reducing or eliminating expensive CAS type operations typically used to acquire write ownership of shared locations targeted by the user code when employing a software-only transactional memory, as well as other CAS type operations associated with privatization mechanisms, as described below. Note, however, that the system may not depend on the ability to commit every transaction using hardware transactional memory. Instead, when necessary (e.g., because a transaction exceeds the limitations of the particular HTM implementation in the system, or due to repeated failures to commit the results within a hardware transaction), a transaction may employ a software-only commit method of the underlying STM implementation.

Systems and methods for exploiting hardware transactional memory to improve the performance of a software transactional memory may be described in more detail by way of the following examples. In various embodiments, there may be different methods for determining which and/or how many tasks the hardware transaction should include (i.e. how the hardware transaction should be employed to improve overall performance of the transactional memory system). In some embodiments, the system may be configured to execute the user code of an atomic transaction just as it would in a pure software transactional memory implementation, which may include recording read and write sets for the transaction during execution of the user code. A number of methods may be employed for optimizing this preparatory phase using a variety of kinds of hardware support, in different embodiments. Although the system may be compatible with a variety of methods for optimizing this preparatory phase using hardware support, the system may not depend on the existence of hardware support for this phase. In this example, when the transactional memory completes execution of the user code, assuming it is not aborted or otherwise prevented from successfully executing the user code, it has recorded in its read set copies of the orecs associated with all data the transaction has read, and has recorded in its write set the addresses of locations to which it has written, as well as the values written to these locations. In this example, code executable to attempt to commit the results of the execution of the user code may be constructed using the information recorded by the software transactional memory. In this example, the system may attempt to execute this constructed code within a single hardware transaction, as described herein.

In some embodiments, executing a hardware transaction to apply the effects of a user transaction T to memory may include the following:
1. begin a hardware transaction
2. attempt to validate the read set of transaction T
3. for each entry in the write set of transaction T:
   3a. if the orec associated with the target location is owned for writing by another transaction, abort the hardware transaction
   3b. address any potential conflicts with transactions reading from memory locations associated with the orec
   3c. copy the value written to the target location by the user code to the corresponding memory location (i.e. perform a write back operation)
4. if applicable, increment a read-write conflict counter
5. attempt to commit the hardware transaction As previously noted, if the attempt to commit the hardware transaction fails, it may in some embodiments be retried (once, or repeatedly). As discussed herein, depending on the reason for failure and the particular HTM implementation, additional remedial action(s) may be taken in an attempt to make a subsequent attempt more likely to succeed. For example, in some embodiments, it may be helpful to prefetch information to warm caches or TLBs before retrying. In some embodiments, if the read validation attempt illustrated in step 2 above fails, or if the hardware transaction is not able to determine that the read set is valid, a subsequent attempt to validate the read set may be undertaken and may succeed, as described in more detail below. Note that in other embodiments, if an orec associated with a location in the write set is owned for writing by another transaction, the conflicting transaction (rather than the current hardware transaction) may be aborted, and the hardware transaction may continue in its attempt to commit the results of the user transaction.

One embodiment of a method for exploiting hardware transactional memory (HTM) in a software or hybrid transactional memory system is illustrated in FIG. 1. As illustrated at 100, the method may include beginning execution of program instructions comprising one or more memory access operations to a shared memory within an atomic transaction using software transactional memory (STM). For example, the program instructions may include a section of user code that is designated as an atomic transaction and that includes one or more read or write operations targeting locations in the shared memory. As illustrated in 120, while executing the user code of the atomic transaction, the software transactional memory system may capture information about all (or a subset of) the transactional read and/or write operations executed within the atomic transaction (i.e. the read set and write set of the atomic transaction).

As illustrated in 130 of FIG. 1, after the STM executes the transaction's user code, the method may include initiating an attempt to commit the atomic transaction within a single hardware transaction using hardware transactional memory (HTM). As illustrated in this example, attempting to commit the atomic transaction may include attempting to validate the reads of the atomic transaction, as in 140. This may include validating one or more read access operations using an invisible reads technique, a semi-visible reads technique, and/or any other suitable technique for validating all or a portion of the read set of an atomic transaction. If the read validation is successful, shown as the positive exit from 150, the method may include determining if there are any potential conflicts with any writes of the atomic transaction, as in 160. Various techniques for determining if there are potential conflicts with writes (e.g., read-write conflicts or write-write conflicts) are described in more detail herein, according to different embodiments. If the attempt to validate the read set of the atomic transaction fails, shown as the negative exit from 150, the method may include the hardware transaction being aborted (e.g., aborting itself), as in 175, and/or retrying the hardware transaction one or more times, shown as the feedback from 175 to 130.

If no potential write conflicts are detected or if any potential write conflicts are addressed, shown as the positive exit from 170, the method may include copying the results of the atomic transaction's writes to the shared memory and committing the hardware transaction, as in 180. If potential write conflicts are detected and not addressed, shown as the negative exit from 170, the method may include the hardware transaction being aborted (e.g., aborting itself), as in 175, and/or retrying the hardware transaction one or more times, shown as the feedback from 175 to 130.

In some embodiments, if the hardware transaction fails to validate reads or fails to commit the atomic transaction for any other reason, the method may include retrying the hardware transaction with or without first taking remedial action(s), such as those described herein. In some such embodiments, there may be a pre-determined or configurable limit on the number of hardware transactions to be attempted before reverting to the use of the software transactional memory to attempt to complete the atomic transaction (e.g., to attempt to successfully validate the read set and/or commit the results of the transaction).

As previously noted, read validation, such as that illustrated in step 2 above, is a process by which software transactions check for consistency of the data with which they are executing, and different read validation techniques may be used to ensure that all reads remain consistent with one another while a transaction is executing, according to various embodiments. In an embodiment that employs an invisible read validation technique, the read set may be validated by iterating over the orecs recorded in the read set and confirming that each orec still contains the value recorded during execution of the user transaction.

Alternatively, in an embodiment in which a semi-visible read validation technique that employs a read-write conflict counter is in use, the read validation of a transaction T may include reading the value of a read-write conflict counter and comparing it to a snapshot taken of the read-write conflict counter during execution of the user transaction. If the counter value matches the snapshot, then no further validation may be required. This is because in such embodiments, any transaction that writes a location read by T cannot commit without incrementing the read-write conflict counter, which will in turn cause T's hardware transaction to fail. On the other hand, if the counter value does not match the snapshot, then the hardware transaction may in some embodiments attempt full validation of the read set, and if successful, may proceed. In other embodiments, in response to the comparison failing, the system may be configured to abort the hardware transaction, perform full read validation outside the hardware transaction (which may include obtaining a new snapshot of the read-write conflict counter), and then retry the hardware transaction. At this point, the hardware transaction may successfully validate the read set using the read-write conflict counter. In other words, a subsequent attempt to perform a quick read set validation by comparing the new snapshot of the read-write conflict counter with the current value of the read-write conflict counter may be successful. In some embodiments, this approach may have the advantage of reducing the duration of the execution of the hardware transaction and/or may reduce the read set of the hardware transaction, either of which may make it less likely that the hardware transaction is aborted.

Figure 2:
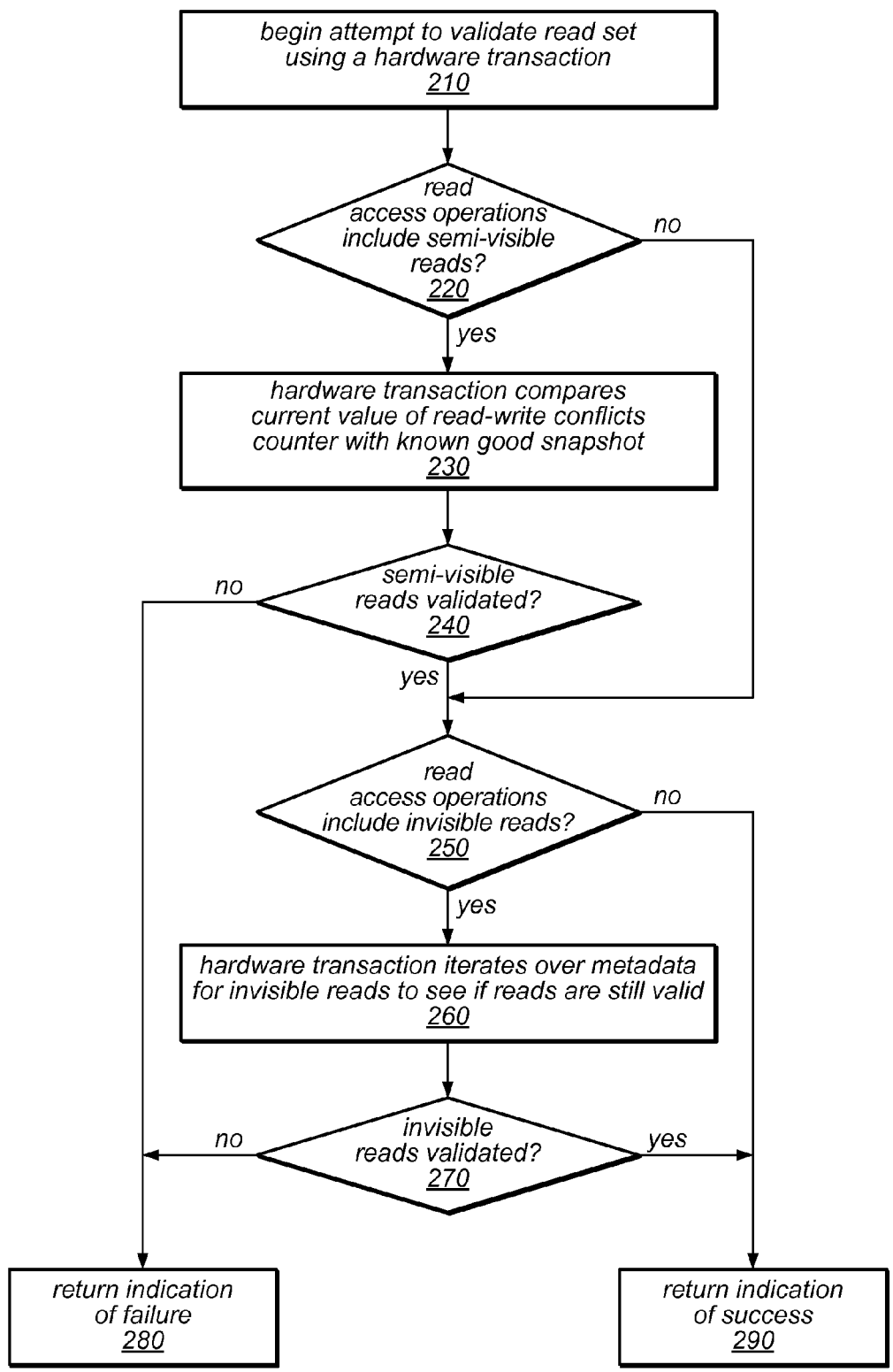
FIG. 2 is a flow diagram illustrating one embodiment of a method for using a single hardware transaction to attempt to validate the read set of a software transaction, as described herein.

One embodiment of a method for using a single hardware transaction to attempt to validate the read set of a software transaction is illustrated in FIG. 2. In this example, it is assumed that the system supports both invisible read validation and semi-visible read validation, although in other embodiments, the system may support more, fewer, or different read validation techniques. As illustrated in 210, the method may include beginning an attempt to validate the read set using a hardware transaction. As shown by the positive exit from 220, if the read access operations of the software transaction include any reads to be validated using a semi-visible read validation technique, the method may include the hardware transaction comparing a current value of a read-write conflicts counter with a known good snapshot of the read-write conflicts counter, as in 230. In other words, the hardware transaction may compare a current value of the counter with a value of the counter that was captured at a point at which the read set was known to be valid (e.g., at the beginning of the software transaction). In this example, if the current value of the read-write counter matches the known good snapshot, the hardware transaction has successfully validated the semi-visible reads. Otherwise, the hardware transaction has failed to validate the semi-visible reads of the software transaction, shown as the negative exit from 240, and the method may include returning an indication of this failure, as in 280.

Once the hardware transaction successfully validates any semi-visible reads of the software transaction (shown as the positive exit from 240), or if there are no read access operations to be validated using semi-visible read validation techniques (shown as the negative exit from 220), the method may include validating any other read access operations in the software transaction's read set using another read validation technique. For example, if the read set includes read access operations to be validated using an invisible reads technique, shown as the positive exit from 250, the method may include the hardware transaction iterating over data and/or metadata (e.g., orecs) for the invisible reads in the read set to see if the values read are still valid, as in 260. If there are no invisible reads to be validated, shown as the negative exit from 250, the method may include returning an indication of success, as in 290 (since there are no additional reads to be validated, in this example). If the invisible read set is validated (e.g., if the hardware transaction iterates over the data and/or metadata for these reads and determines that they are still valid), the method may include returning an indication of success. This is illustrated in FIG. 2 as the positive exit from 270 and element 290. If the attempt to validate the invisible reads fails (e.g., if the metadata for these reads indicates that at least one of the reads is no longer valid), the method may include returning an indication of failure. This is illustrated in FIG. 2 as the negative exit from 270 and element 280.

As illustrated in step 3 (and in steps 3a-3c) above, if the read set is successfully validated, the hardware transaction may in some embodiments attempt to commit the results of the user transaction through write back operations to each of the locations modified by the user transaction, as reflected in the write set of the user transaction. In such embodiments, for each entry in the write set, the hardware transaction may determine if the orec associated with one or more targeted locations is owned for writing by another transaction (as in 3a), and if so, the hardware transaction may be configured to abort itself. If the orec is not owned for writing by another transaction, the hardware transaction may determine if there are any potential conflicts with transactions reading from any of the locations associated with the orec (as in 3b). For example, in one embodiment, the hardware transaction may be configured to check the value of a SNZI associated with the orec to determine if there are any other readers. If so, the hardware transaction may address them before determining whether to continue. For example, in one embodiment, if there are other readers of a location in the write set of the user transaction, the hardware transaction may modify the orec to indicate the write operation, and increment a read-write conflict counter. Note that in this case, i.e. in embodiments in which the hardware transaction increments a read-write conflicts counter in response to detecting a conflict with one or more readers, the transaction may only need to increment the read-write conflicts counter once, not once for each conflict detected. Therefore, this may be done once in a separate step (as illustrated by step 4 above), rather than for each conflict with an entry in the write set of the transaction. If there are no potential conflicts, or if potential conflicts have been addressed, the hardware transaction may perform the write back operation, copying the value written to the target location by the user code to the corresponding memory location (as in 3c).

Note that while in several examples described herein, if a hardware transaction encounters a write-write conflict with another transaction, the hardware transaction aborts itself, in other embodiments the hardware transaction may abort the conflicting transaction instead. In other words, in some embodiments a hardware transaction attempting a write back operation may abort another transaction that owns one or more of the orecs associated with locations in its write set for writing, and may continue its attempt to perform the write back operation.

As described herein, in various embodiments hardware transactional memory may be employed in an attempt to commit the results of an atomic transaction that is otherwise implemented using software transactional memory. In such embodiments, if the hardware write back attempt is not successful, the software transactional memory may be configured to attempt to resolve potential conflicts or otherwise address any issues that may have caused the hardware write back attempt to fail. For example, in various embodiments, the software transactional memory may be configured to perform read set validation and/or to attempt to commit the transaction in response to a failed hardware write back attempt. In other embodiments, the software transactional memory may be configured to take remedial steps (depending on the reason for the failure) and then to retry the hardware write back operation.

Figure 3:
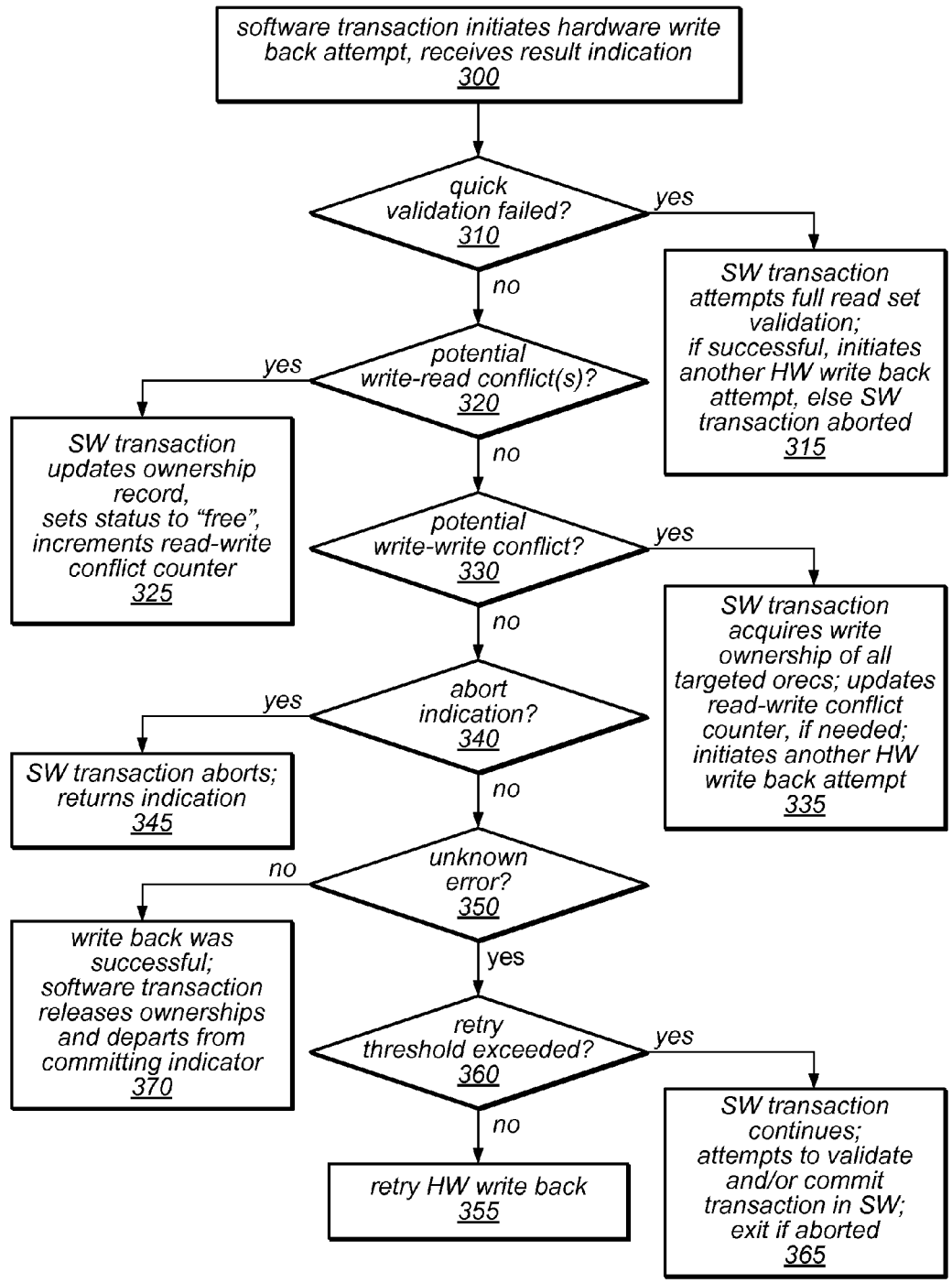
FIG. 3 is a flow diagram illustrating one embodiment of a method for a software transaction to attempt to commit its results using a hardware transaction, as described herein.

One method for a software transaction to attempt to commit results of an atomic transaction using a hardware transaction is illustrated in FIG. 3. As illustrated at 300 in this example, the method may include a software transaction initiating a hardware write back attempt and receiving an indication of the result of the attempt. For example, in embodiments in which semi-visible reads are supported, if the hardware transaction determines that the current value of a read-write conflicts counter does not match a value of the read-write conflicts counter that was captured at a point at which the read set was known to be valid, the software transaction may receive an indication that this quick validation failed. If the indication indicates that a quick read set validation performed by the hardware transactional memory failed, shown as the positive exit from 310, the method may include the software transaction attempting a full read set validation (e.g., iterating over the orecs in its read set to determine whether the reads performed by the user transaction are still valid), as in 315. If the full read set validation is successful, the method may include the software transaction initiating an additional hardware write back attempt. If the full read set validation is not successful, the software transaction may be aborted (e.g., it may abort itself).

As previously noted, if a hardware transactional memory is employed in a write back attempt, the hardware transaction may be configured to determine if there are any potential or actual conflicts with any of the write operations within the atomic transaction. If the hardware transaction returns an indication that there is at least one potential write-read conflict, shown as the positive exit from 320, the method may include the software transaction updating the ownership records associated with locations involved in potentially conflicting write operations and incrementing a read-write conflict counter. For example, the software transaction may update a current/latest writer field of such ownership records to reflect the identifier of the transaction that is attempting to commit a write operation. In addition, the software transaction may change a status indicator associated with memory locations involved in the potential conflict(s). For example, in some embodiments, the method may include setting the status of ownership records associated with those locations to "free" (e.g., by writing a particular value to a status field in those ownership records). This combination of actions (illustrated in 325) may eventually cause other transactions that are reading those locations to abort. For example, incrementing the read-write conflict counter may cause other transactions that are reading those locations to perform a full read set validation, which may involve checking the latest-writer field of the associated ownership records. The fact that the latest-writer field was updated may then cause the other reading transactions to abort themselves or be aborted.

As illustrated in this example, if the hardware transaction returns an indication that there is a potential write-write conflict (shown as the positive exit from 330), the method may include the software transaction acquiring write ownership of all orecs associated with memory locations targeted by write access operations in the atomic transaction, and initiating an additional hardware write back attempt, as in 335. In some embodiments, the software transaction may also update a read-write conflict counter (e.g., the software transaction may increment the counter), if needed, to indicate that a potential conflict has been detected.

As illustrated in FIG. 3, if the hardware transaction returns an indication that the atomic transaction should be aborted, shown as the positive exit from 340, the method may include the software transaction being aborted (e.g., the software transaction may abort itself), as in 345. As illustrated in this example, the method may also include the software transaction returning an indication to the process that initiated execution of the atomic transaction that the atomic transaction was aborted and/or that execution of the atomic transaction failed. If the hardware transaction returns an indication of an unknown error (shown as the positive exit from 350), e.g., if the hardware transaction fails for one or more reasons other than those described above, the method may include retrying the hardware write back attempt. In some embodiments, the software transaction may initiate a retry of the hardware write only if a retry threshold has not been exceeded, shown as the positive exit from 360, and element 355. As illustrated in FIG. 3, if the retry threshold has been exceeded, shown as the positive exit from 360, the method may include the software transaction continuing and attempting to validate and/or commit the transaction in software (i.e. without attempting another hardware write back), as in 365. In this example, if the software transaction is (or has been) aborted, the method illustrated in FIG. 3 may finish (exit) without committing the results of the software transaction (e.g., the results of the user code executed within the software transaction).

If no other errors are indicated by the result indication, shown as the negative exit from 350, the method may include the software transaction releasing any ownership records it has acquired for reading and/or writing, and departing from a committing indication, as in 370. In other words, if the method illustrated in FIG. 3 reaches element 370, there were no errors returned by the hardware transaction, and the hardware transaction has succeeded in committing the results of the software transaction as a hardware write back operation, in this example. The method depicted in FIG. 3 and described above may be further illustrated by way of the example pseudo code found below. In this example, it is assumed that the system supports non-transactional writes inside hardware transactions. The pseudo code for committing a transaction shown below calls additional code for attempting a hardware write back operation, shown later. In this example, the code for attempting a hardware write back operation is called as ErrCode HwWriteBack(bool abortConfReaders, bool alreadyHaveWOwnership). As illustrated in this example, a hardware write back operation may return an error code indicating whether the attempt was successful and, if not, a reason why the attempt was not successful. Note also that in this example it is assumed that the system supports privatization through the use of committing indicators, such as those included in the pseudo code below. A description of the use of committing indicators to support implicit privatization can be found in co-pending U.S. patent application Ser. No. 12/101,316, entitled "Efficient Implicit Privatization of Transactional Memory", and naming Yosef Lev, Nir N. Shavit, David Dice, and Mark S. Moir as co-inventors.

```
Commit
{
    bool wrOwnOrecs = false;
    // initiate hardware write back attempt; receive indication of result
```

-continued

```
    if (status != Aborted) {
      ErrCode err = HWWriteBack(false, false);
      while (err != None) {
        switch err
          case RValidFailed:
            if (Validate( )) {
              err = HWWriteBack(false, wrOwnOrecs);
            } else {
              Abort(wrOwnOrecs);
              return false;
            }
            break;
          case WRConf:
            // write-read conflict cannot be reported if transaction already
            // has write ownership of orecs (see code of HWWriteBack
            // below)
            assert(!wrOwnOrecs);
            // Simple strategy to abort readers.
            //
            err = HWWriteBack(true, false);
            break;
          case WWConf:
            // write-write conflict cannot be reported if transaction already
            // has write ownership of orecs (see code of HWWriteBack
            // below)
            assert(!wrOwnOrecs);
            acquire write ownership of all orecs in write set;
            update RWConfCounter (once) if needed;
            wrOwnOrecs = true;
            if (status == Aborted) {
              Abort(wrOwnOrecs);
              return false;
            }
            err = HWWriteBack(false, wrOwnOrecs);
          case Aborted:
            Abort(wrOwnOrecs);
            return false;
          case RWConfCounter:
          case Unknown:
            retry++;
            if (retry < Threshold &&
              failure reason does not indicate that retry is futile) {
              err = HWWriteBack(false, wrOwnOrecs);
            } else {
              // Continue in software, exit if aborted.
              ...
            }
        }
      }
      // If this point is reached, commit has succeeded; cleanup and
      // return true.
      release read ownership and depart from a committing indicator;
      if (wrOwnOrecs) {
        release write ownership and wait for the committing indicator to
        be unset;
      } else {
        wait for the committing indicator to be
        unset;
      }
      return true;
    }
    Abort(wrOwnOrecs);
    return false;
}
```

Figure 4:
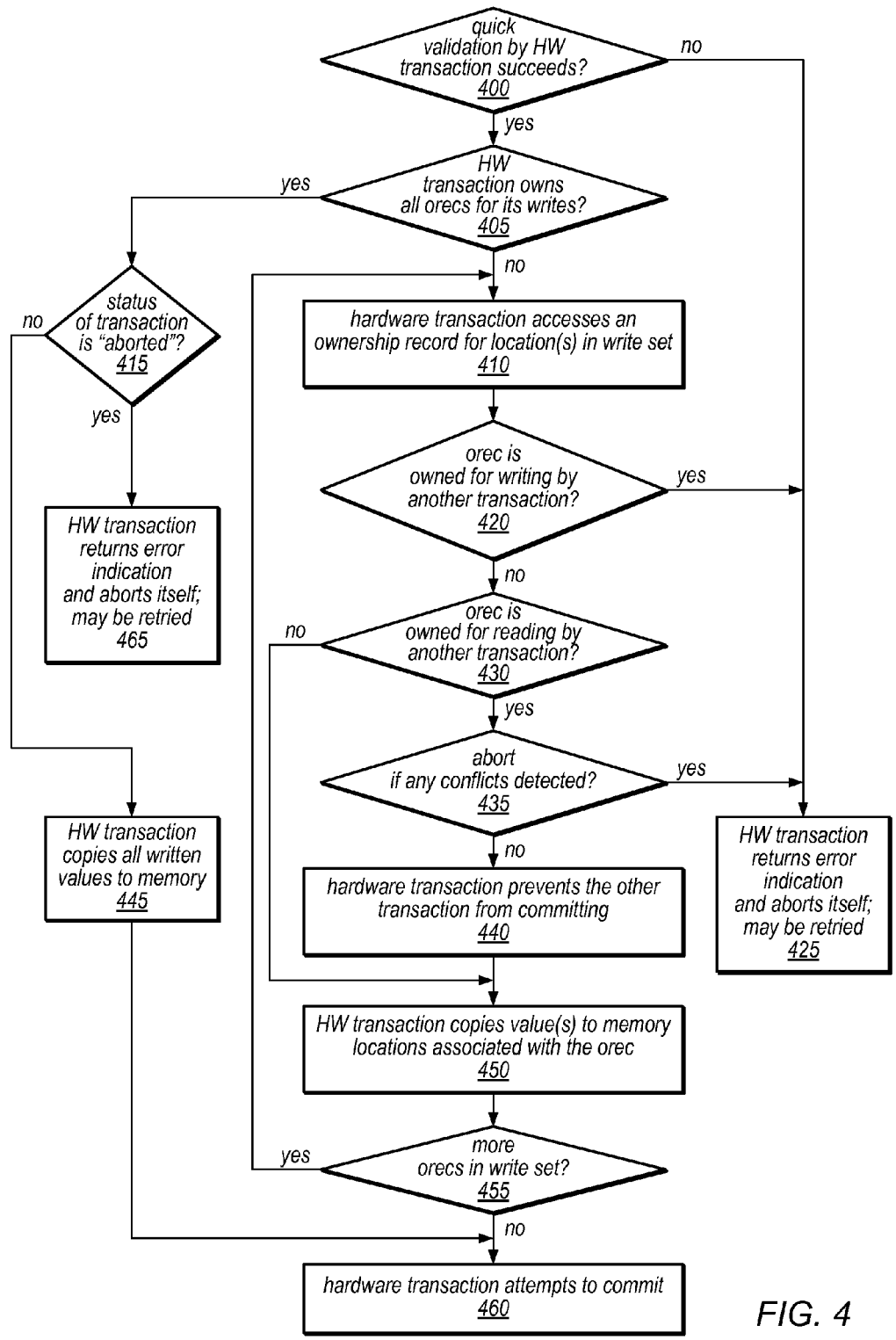
FIG. 4 is a flow diagram illustrating one embodiment of a method for using a hardware transaction to attempt to commit results of a software transaction, as described herein.

A method for utilizing a hardware transaction in attempting to commit results of a software transaction is illustrated in FIG. 4, according to one embodiment. In this example, the software transaction may have initiated a hardware transaction configured to attempt a write back of the results of an atomic transaction as part of an attempt to commit the atomic transaction (as shown in element 300 of FIG. 3). As illustrated in this example, the method for performing the hardware write back attempt may include the hardware transaction attempting a quick read set validation (e.g. by comparing a current value of a read-write conflict counter with a previously recorded value), as described above. If this quick validation fails, shown as the negative exit from 400, the method may include the hardware transaction returning an error indication to the software transaction and aborting itself, as in 425. As above, the error indication may indicate the specific reason that the hardware write back attempt failed (i.e. because the quick validation failed, in this case). As illustrated in this example, in some embodiments, the hardware transaction may be retried. If the quick validation succeeds, shown as the positive exit from 400, the method may include determining whether the hardware transaction owns (for writing) all of the orecs associated with locations associated with write operations of the atomic transaction. If so, shown as the positive exit from 405, the method may include determining if the status of the transaction is "aborted", as in 415. If the transaction status is "aborted" (shown as the positive exit from 415), the method may include the hardware transaction returning an error indication to the software transaction and aborting itself, as in 465. If not, shown as the negative exit from 415, the method may include the hardware transaction copying all values written by the software transaction to memory, as in 445. In other words, the method may include the hardware transaction performing a write back operation for all of the locations in the write set of the software transaction.

If, on the other hand, the hardware transaction does not own all of the orecs associated with those targeted locations for writing, shown as the negative exit from 405, the method may include the hardware transaction accessing the ownership record for each of the locations in the write set of the transaction. As illustrated in FIG. 4, the hardware transaction may access a first ownership record associated with one or more of the locations in the write set, as in 410. If that ownership record is owned for writing by another transaction, shown as the positive exit from 420, the method may include the hardware transaction returning an error indication to the software transaction and aborting itself, as in 425. As above, the error indication may indicate the specific reason that the hardware write back attempt failed (i.e. because at least one of the locations in the write set is owned for writing by another transaction, in this case). As illustrated in this example, the hardware transaction may be retried, in some embodiments.

If the ownership record indicates that no other transaction is or may be reading one or more of the locations in the write set (i.e. if there are no potential read-write conflicts), shown as the negative exit from 430, the method may include the hardware transaction copying values written by the software transaction to memory, as in 450. In other words, in this case the hardware transaction may perform a write back operation to one or more locations associated with the ownership record. As illustrated in FIG. 4, if there is a potential read-write conflict (e.g., if the ownership record is owned for reading by another transaction), shown as the positive exit from 430, and if the system is configured to abort the transaction in the case that any conflicts are detected, shown as the positive exit from 435, the method may include the hardware transaction returning an error indication to the software transaction and aborting itself, as in 425. As above, the error indication may indicate the specific reason that the hardware write back attempt failed (i.e. because a potential read-write conflict was detected, in this case). As illustrated in this example, the hardware transaction may be retried, in some embodiments.

If a potential read-write conflict is detected, but the system is not configured to abort the transaction when such conflicts are detected, shown as the negative exit from 435, the method may include the hardware transaction preventing the other transaction (the transaction that is or may be reading one or more of the locations in the write set) from committing, as in

440. For example the hardware transaction may update the orec and increment a read-write conflict counter, which may subsequently cause other transactions that are reading those locations to abort. In this case, the method may continue with the hardware transaction copying values written by the software transaction to the memory locations associated with the orec, as in 450. In other words, in this case the hardware transaction may perform a write back operation to one or more locations associated with the ownership record. If there are more orecs in the write set of the software transaction, shown as the positive exit from 455, the method may include repeating the operations illustrated in 410-450 of FIG. 4 for one or more other orecs. This is illustrated in FIG. 4 as the feedback loop from 455 to 410. If there are no other orecs in the write set to be accessed, shown as the negative exit from 455, and if the hardware transaction has not been aborted, the method may include the hardware transaction attempting to commit, as in 460.

Note that in some embodiments, the system described herein may be configured to exploit the fact that all write operations of a hardware transaction will take effect only if and when the transaction commits. In one such embodiment, the system may be configured to execute the operations illustrated in FIG. 4 and described above in a different order. For example, the hardware transaction may write back all values in the write set to memory earlier in the process, e.g., before checking for any conflicts with other transactions. If any conflicts are detected, the entire hardware transaction will not take effect. In one example, such a method may include executing the operations illustrated in 415 of FIG. 4 (copying back all values written by the transaction), and only then executing the read set validation and/or conflict resolution operations illustrated in elements 400, 410, 420-440 and 455 of FIG. 4. If the read set validation or conflict resolution operations fail, the hardware transaction may be aborted and the write back operation performed earlier (at 415) will not take effect.

As discussed above in reference to element 300 of FIG. 3, the hardware write back attempt method illustrated in FIG. 4 may return an indication of any error that is encountered, or may return with no error indication (or an indication of success) in the case that the hardware write back attempt successfully completes and commits. If the attempt to commit the hardware write back fails, the hardware transaction attempting the write back operation may return an error indication indicating the specific reason that the hardware write back attempt failed (i.e. because the hardware transaction attempting the write back failed to commit, in this case) or may return a different or an unknown error indication, in various embodiments. In some embodiments, if the hardware write back attempt fails to commit, the hardware transaction may be retried (not shown). The method depicted in FIG. 4 and described above may be further illustrated by way of the example pseudo code found below. In this example, it is assumed that the system supports non-transactional writes inside hardware transactions, and that all writes to the local variable err are performed using non-transactional writes. However, in other embodiments, the system may not support the performance of non-transactional writes within transactions.

enum ErrCode { None, RValidFailed, WRConf, WWConf, Aborted, RWConfCounter, Unknown}
ErrCode HwWriteBack(bool abortConfReaders, bool alreadyHaveWOwnership)

-continued

```
{
  ErrCode err = Unknown;
  if (beginHT( )) {
    if (!quick-validate-using-RWConfCounter( )) {
      err = RValidFailed;
      abortHT( );
    } else {
      if (alreadyHaveWOwnership) {
        if (status == Aborted) {
          err = Aborted;
          abortHT( );
        }
        Copy back values for all orecs;
      } else {
        bool IncRWConf = false;
        for each orec in write set {
          if (orec owned by another writer) {
            err = WWConf;
            abortHT( );
          }
          if (orec owned by other reader(s)) {
            if (!abortConfReaders) {
              err = WRConf;
              abortHT( );
            } else {
              IncRWConf = true;
              Set orec status to Free (no readers) with this transaction
              id + version;
            }
          }
          Copy back values for this orec;
        }
        if (IncRWConf) {
          // If incrementing the global RWConfCounter causes
          // transaction to abort, it may be useful to report that it
          // reached this point via the error code.
          err = RWConfCounter;
          RWConfCounter++;
        }
      }
      commitHT( );
      err = None; // If this point is reached, hw transaction committed
      successfully
    }
  }
  return err;
}
```

As noted above in reference to step 3b, if there is a potential write-read conflict (i.e., if another transaction is or may be reading a location written by a given transaction T), then either the conflict may be resolved so that any such reading transaction(s) is (are) prevented from committing, or T may abort itself. Options available for preventing the readers from committing may depend on the read validation scheme(s) in use. For example, in a system that employs invisible reads, the hardware transaction may modify the orec in order to cause subsequent validations by such readers to fail. However, this may effectively double the size of the write set for the hardware transaction, which may be significant for some HTM implementations. For example, in some embodiments, the number of stores that can be performed in a successful hardware transaction may be limited by the size of the store buffer of the HTM implementation. Therefore, in such embodiments, this approach may result in a significant increase in hardware transaction failures for some workloads.

In a system in which semi-visible reads are employed, the hardware transaction may be configured to increment a read-write conflicts counter in order to cause conflicting readers to fail their subsequent fast validation. However, unless the hardware transaction also modifies the orec, as discussed above, this may not prevent subsequent full validation by a reader from failing because the orec has not changed. In other words, in systems in which snapshots of orecs are used for read validation, if the value in one location associated with a given orec changes, it may be treated as a read-write conflict and may cause the transaction to abort, even if that particular location is not targeted by the user transaction (e.g., if the targeted location associated with the orec is a different location associated with the orec, such as another location in the same cache line).

In some embodiments, a requirement to perform additional writes to orecs in the hardware transaction in the case described above may be avoided by modifying the full read validation of software transactions to support so-called "value-based validation." Value-based validation may be used to confirm that values read previously are still (or again) stored in the targeted memory location(s) associated with each orec in the read set. In one embodiment, this may be achieved by taking a new snapshot of the read-write conflicts counter, and then for each orec in the read set: acquiring read ownership of the orec if it is not already held, confirming that the values read previously from memory locations associated with the orec match the current contents of those memory locations, confirming that the orecs have not changed since they were previously read, and finally checking to see that the read-write conflicts counter value has not changed again. In this example, if all of these checks succeed, then no hardware transaction has modified any of the targeted memory locations since they were validated (using the new snapshot). If a hardware transaction had modified one of the targeted locations, it would have detected the potential conflict and therefore incremented read-write conflicts counter. Thus, the last check would have failed.

Figure 5:
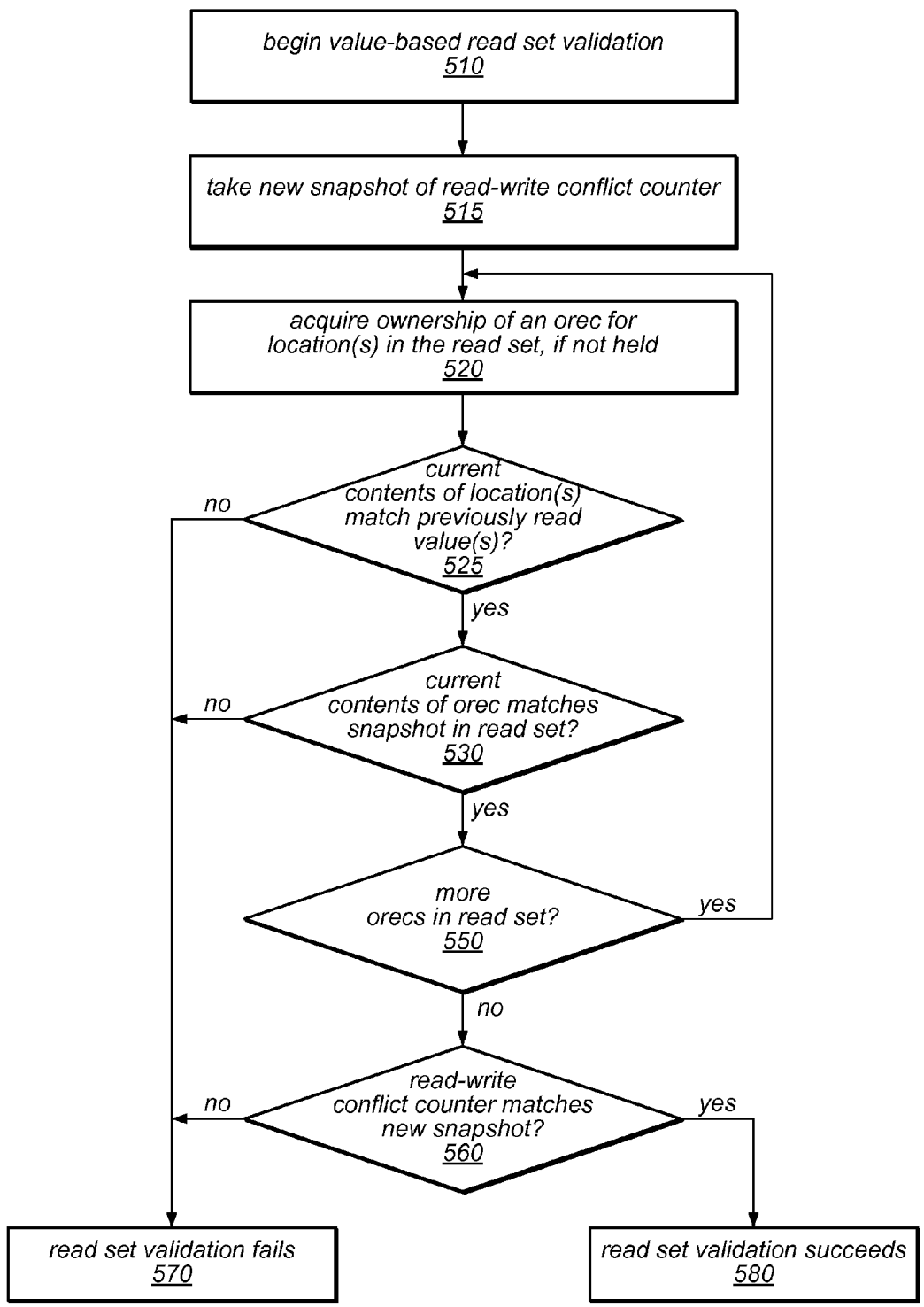
FIG. 5 is a flow diagram illustrating one embodiment of a method for performing value-based validation, as described herein.

A method for performing value-based validation is illustrated in FIG. 5, according to one embodiment. In this example, when a hardware transaction invoked in an attempt to commit the results of a software transaction detects a potential read-write conflict (e.g., if a read-write conflicts counter indicates that a full read set validation should be executed), the software transaction may begin a value-based read set validation to determine if an actual read-write conflict exists, as in 510. As illustrated at 515 in this example, the method may include taking a new snapshot of a read-write conflict counter. The method may also include acquiring ownership of an orec associated with one or more locations in the read set (if the atomic transaction does not already hold ownership of the orec), as in 520. For each of the locations in the read set associated with the acquired orec, the method may include determining whether the current contents of that location matches a value previously read from that location, as in 525. If not, shown as the negative exit from 525, the read set validation may fail, as in 570.

If the current contents of all of the locations in the read set associated with the acquired orec match the values previously read from those locations, shown as the positive exit from 525, the method may include determining whether the current contents of the acquired orec itself matches the snapshot of the orec in the read set, as in 530. If not, shown as the negative exit from 530, the read set validation may fail, as in 570. As illustrated in this example, if the current contents of the acquired orec matches the snapshot in the read set (shown as the positive exit from 530) and if there are more orecs in the read set (shown as the positive exit from 550), the method may include repeating the operations illustrated in elements 520-550 of FIG. 5 for one or more additional orecs in the read set. This is illustrated in FIG. 5 by the feedback loop from 550 to 520. As illustrated at 560, if there are no additional orecs in the read set (shown as the negative exit from 550), the method may include determining whether the current value of the read-write conflict counter matches the new snapshot taken of the read-write conflict counter at 515. If not, shown as the negative exit from 560, the read set validation may fail, as in 570. If the current value of the read-write conflict counter matches the new snapshot taken of the read-write conflict counter at 515, shown as the positive exit from 560, the read set validation may succeed, as in 580.

Note that while the method illustrated in FIG. 5 includes a loop by which individual orecs are acquired in turn and the corresponding read set locations are examined, in other embodiments a method for performing value-based read set validation may include acquiring all of the targeted orecs before examining the contents of any read-set locations to determine if the current contents match values previously read from those locations.

While the example above describes the use of value-based read validation in a system that employs semi-visible reads, in other embodiments, value-based read validation may be employed in conjunction with invisible reads. For example, in one such embodiment, a hardware transaction may be used to confirm that all previously read values are currently stored in the read-from memory locations and to confirm that none of the orecs associated with these locations is owned for writing by any transaction.

In embodiments in which fully visible reads are employed, such that the identity of transactions that have read ownership of an orec can be determined by a conflicting writer, the hardware transaction may explicitly abort such transactions upon determining that there is a conflict. While this approach may introduce additional complexity, and may introduce additional write operations in the hardware transaction in the case that write conflicts with heavily read-shared locations are common, it may avoid these additional writes and additional complexity when there are no write-read conflicts. Similarly, in embodiments in which semi-visible reads are employed and a writer modifies the orec to cause conflicting readers to abort, the additional writes may be needed only for orecs in which a write-read conflict is encountered. In contrast, when using invisible reads, the hardware transaction may need to perform additional writes to update the orec(s) associated with every location it writes, even if there are no conflicts, because the hardware transaction cannot determine whether such conflicts exist.

Note that while the value-based read validation techniques described herein may impose overhead in the case that full validation is performed (since they require that values read, and not just snapshots of orecs, are recorded in the read set of a transaction), in many embodiments, full validation may not be needed in the common case.

In some embodiments, the transactional memory system may include an HTM implementation that does not place constraints on the size of read and write sets (i.e. it provides an unbounded HTM). In such embodiments, the methods described herein may be simplified somewhat even if the HTM imposes other limitations, such as that it does not support certain instructions within hardware transactions. For example, in embodiments that provide unbounded HTM, the HTM support may be sufficiently robust that there may never be a need to resort to a software-only transaction commit operation. Therefore, there may never be a need for transaction to acquire explicit write ownership of any orec. In such embodiments, orecs may only be used to indicate read ownership in order to allow conflict detection between writes and reads, as in step 3b above. In such embodiments, the operations described in step 3a may no longer be required. However, such embodiments may be affected by the issues discussed herein regarding write operations that cause full validation of conflicting reads to fail. To avoid these issues, some such embodiments may employ value-based validation, while in other embodiments the hardware transactions must update orecs associated with locations they write if write-read conflicts are detected or potentially exist, as described above.

In some embodiments in which transactions may resort to the commit mechanism of the underlying STM, the performance of the system may still be improved through the use of hardware transactions. For example, a significant part of the overhead of committing a software transaction is in performing a number of expensive CAS type operations to acquire write ownership of orecs associated with locations to be written, to increment committing indicators of orecs in the read set, and/or to subsequently decrement those indicators after completing the write back operation. In some embodiments, the system may be configured to combine the effects of multiple such CAS operations into a single hardware transaction, rather than executing them individually. This may be a more efficient approach, since CAS and similar synchronization operations often have strong ordering requirements that may necessitate (or otherwise result in) the use of expensive techniques such as flushing store buffers, clearing pipelines, etc. for each such operation. When multiple such operations are combined into a single atomic transaction, the overhead related to such ordering may be paid only once for the transaction, rather than once for each of the underlying synchronization operations. Therefore, while the cost of employing a hardware transaction to apply the effects of a single CAS operation may be comparable to the cost of applying the CAS operation directly, combining the effects of additional CAS operations into the hardware transaction may incur significantly less cost than performing additional individual CAS operations.

Note that in some embodiments, it may not be necessary to acquire all write ownerships for a given user transaction in a single hardware transaction. In such embodiments, if the reason that a given user transaction cannot be committed using a single hardware transaction is that it exceeds the hardware resources of the HTM feature, acquisition of write ownership for all entries in the write set of the transaction may be divided into two or more hardware transactions, and the groups into which the acquisition are divided may be chosen so as to acquire as many ownerships in a single hardware transaction as possible while not exceeding the limitations of the HTM implementation. In some embodiments, this approach may also be applied in situations in which conflicts are frequent. In such embodiments, breaking the ownership acquisition phase into smaller transactions may make these transactions less likely to be aborted and/or may lower the cost of any one or more of them being aborting. In various embodiments, any of a variety of approaches may employed to record costs and success rates of various choices made to break up the ownership acquisition phase into multiple hardware transactions, and to adapt parameter choices to achieve the best performance. This may be done dynamically (e.g., with runtime profiling), or using offline profiling to choose fixed parameters for subsequent execution, in different embodiments.

The methods described herein for improving performance of a software transactional memory by employing hardware transactions to perform read validation and/or commitment of the results of user transaction may be employed in transactional memory systems that do not support implicit privatization, and/or may provide additional advantages when employed in a system that does support implicit privatization. The use of these methods in systems that include privatization mechanisms may be described by way of the following example.

Privatization is directed to avoiding problems that may arise in some systems in the time interval after the last read validation and before the write set has been copied back to memory. In embodiments in which the read validation and the write back operation are performed together in a single hardware transaction, this interval does not exist. Therefore, there may be no need for a user transaction that commits using a hardware transaction to update committing indicators associated with its read set in order to provide privatization (i.e. there may not be a need to pay any overhead to provide privatization). However, in some embodiments, a transaction that commits using the methods described herein may have to wait for other transactions that do not use hardware transactions to commit. In other words, a given transaction may not pay any overhead for protecting the shared memory (or other transactions) from its own writes, but the transaction might have to wait for other transactions that are writing locations that were privatized by the given transaction, if the other transactions do not also employ hardware transaction to commit their results. Thus, the methods described herein may in some embodiments eliminate most of the overhead of supporting privatization, leaving only the time required for waiting for the committing indicators of the orecs in the write set to drain. Note that in some embodiments, this waiting may be done after the hardware transaction is committed.

In some embodiments, the overhead of implicit privatization may depend only on the size of the write set of the transaction, whereas updating committing indicators would have required expensive CAS type operations, and would have been done for each orec covered by the read set (which is typically much larger than the write set). Furthermore, because transactions committed using a hardware transaction may not need to update the committing indicators, the need to wait for a committing indicator to drain may in many embodiments arise infrequently. In some embodiments, committing indicators may be implemented using scalable non-zero indicators (such as the SNZI indicators described above). Using SNZI for such indicators may in some embodiments reduce the likelihood that a committing hardware transaction aborts due to a change in the value of a committing indicator. For example, this may be the case in embodiments in which the SNZI indicator bits reside in orecs that the hardware transactions read in order to detect conflicts.

Note that, in some embodiments, it may be possible that a committing indicator for an orec may never drain. This may occur, for example, because transactions can commit without acquiring ownership of orecs for writing, and new readers may repeatedly update the committing indicator to a non-zero value. However, this may be unlikely to occur in practice because of the reduced number of transactions that are required to update the committing indicators. In some embodiments, this issue may be avoided if transactions that wait longer than a pre-determined time limit for a committing indicator to drain acquire write ownership of the associated orec in order to force it to eventually drain.

To support good choices in systems that employ hardware transactions to perform read validation and/or commitment of the results of atomic transactions that are otherwise implemented using software transactional memory, in some embodiments, the system may be configured to collect various timing statistics and/or other statistical information pertaining to success or failure of the atomic transaction. For example, any or all of the following information may be collected and analyzed in different embodiments, and may be used to determine when and if to attempt read validation and/or commitment using a hardware transaction; to determine when, if, and how to divide ownership acquisition into multiple hardware transactions; and/or to determine other parameters of the application of the methods described herein:

- Time of execution of successful commit operations
- Average execution time of and number of failed commit operations for which commitment using a hardware transaction was not attempted (e.g., commit operations of transactions for which the status was Aborted when the hardware transaction was initiated, as illustrated in the pseudo code above).
- Average execution time of and number of failed commit operations that never reached a point at which they could be implemented using the software path (e.g., due to read validation failure).
- Average execution time of and number of failed commit operations that failed in the software path.
- Average execution time of and number of successful commit operations that succeeded in the software path.
- Average execution time of and number of successful commit operations that eventually succeeded in the hardware path.
- Average execution time of and number of successful commit operations that eventually succeeded in the hardware path without obtaining write ownership (externally).
- In commit operations that eventually succeed in hardware, the average number of retries performed due to contention.

In various embodiments, any of a variety of techniques may be employed for collecting these and/or other statistics and/or for using them to make choices about the execution of a given transaction, such as those illustrated in the pseudo code above. For example, in some embodiments the hardware transaction employed to perform read validation and commit results may include operations configured to collect such statistics (outside of the user transaction code) using transactional write operations, or using non-transactional write operations (if non-transactional writes are supported by the transactional memory system). For example, in some embodiments, non-transactional write operations may be supported within hardware transactions, and may be used to store statistical information about currently executing transactions in memory for subsequent analysis. In such embodiments, data collected by non-transactional write operations may not be lost even if the transactions themselves fail to commit (depending on the reason for failure). In other embodiments, such statistics may be collected outside of the hardware transaction (e.g., within the software transaction that executes the user code, by the operating system, or by other system code), again using non-transactional write operations. In still other embodiments, a subset of the desired collection of statistics may be collected from within the hardware transaction, while other statistics may be collected outside of the hardware transaction and/or the software transaction that executes the user code). In systems that support non-transactional write operations, it may be possible to log information indicating the reasons that a hardware transaction failed, such as whether the hardware transaction failed because it detected a conflict with a SW transaction or because the hardware transaction failed to validate the read set of the user transaction.

Figure 6A:
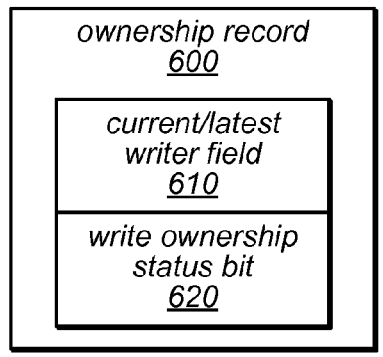
FIGS. 6A-6E illustrate various embodiments of ownership records and other data structures associated with a memory area in a transactional memory system, as described herein.

As described herein, each location in shared memory may be associated with an ownership record, which may be used in managing read and/or write accesses to that location (and, optionally, one or more other locations in the shared memory), according to various embodiments. FIGS. 6A-6E illustrate various ownership records and other data structures associated with each location (or memory area), according to different embodiments. These data structures are merely examples of data structures that may be used in managing transactional memory accesses, and are not meant to be limiting. In other embodiments, more, fewer, or different data structures may be employed in transactional memory systems, and those data structures may include more, fewer, or different fields. In one example, FIG. 6A illustrates an ownership record 600 that includes a write ownership status bit 620 (indicating whether or not the associated memory area is currently owned for writing by a software transaction), and a current/latest writer field 610 (comprising an indication of the transaction, if any, that currently owns the memory area for writing, or, if the memory area is not currently owned for writing, an indication of the latest transaction to have owned the memory area for writing). In some embodiments, a transaction may use a CAS type operation to update the write ownership status bit 620 and/or current/latest writer field 610 when acquiring and/or releasing write ownership.

Figure 6B:
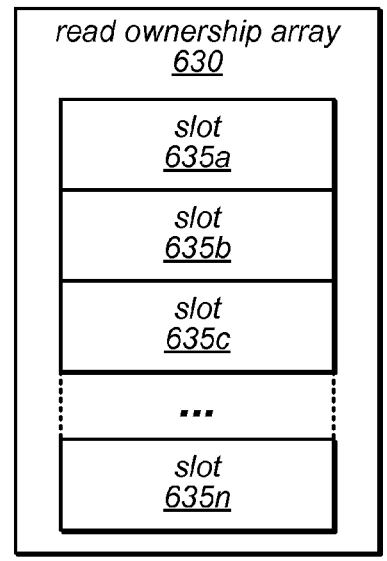

In some embodiments, ownership record 600 of FIG. 6A may be associated with a read ownership array 630, such as that illustrated in FIG. 6B. As illustrated in FIG. 6B, read ownership array 630 may include an array of entries (e.g., bytes), each indicating whether a corresponding thread owns the memory area for reading. In other words, read ownership array 630 may record information identifying the threads executing transactions that own the associated memory area for reading. In some embodiments, all threads are "slotted", i.e., each thread in the system corresponds to a dedicated entry in each read ownership array. For example, read ownership array 630 may include one or more slots 635a-635n, each indicating whether a corresponding thread a-n owns the associated memory area for reading. In this example, a memory area (and/or its ownership record) may be owned for writing if and only if its write ownership status bit indicates so (e.g., if it is non-zero), and the memory area (and/or its ownership record) may be owned for reading if and only if one or more of the entries in its read ownership array is non-zero, and the write ownership status bit does not indicate that it is owned for writing. Otherwise, the memory area and its ownership record may be considered to be free (not owned). In this example, to acquire ownership record 600 for reading, a transaction may first check the write ownership status bit 620 to determine if the ownership record is owned for writing. If not, the transaction may update the appropriate entry 635 of the read ownership array 630 associated with ownership record 600 to indicate that the transaction owns the ownership record for reading, and then may check the write ownership status bit 620 again to ensure that it has not been set since the last time it was checked and that the ownership record is now owned for reading.

Figure 6C:
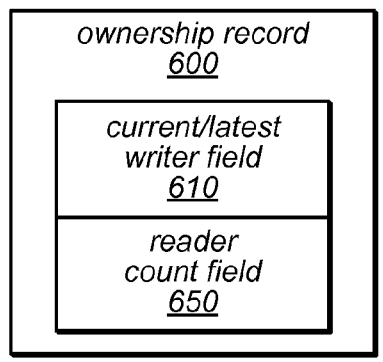
Figure 6D:
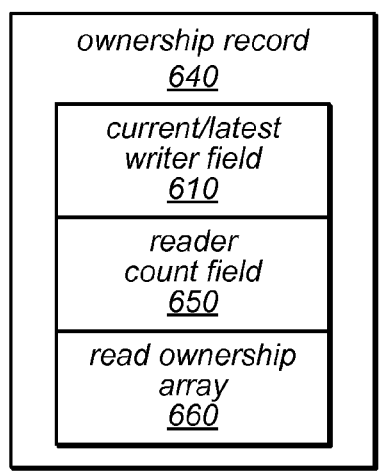

FIG. 6C illustrates an ownership record 680, according to a different embodiment. In this example, ownership record 680 includes a current/latest writer field 610, such as that described above, and a reader count field 650 (indicating the number of transactions that currently own the associated memory area for reading without identifying the particular transactions). In some embodiments, a transaction may use a CAS type operation to attempt to acquire read ownership of one or more memory locations associated with ownership record 680. For example, a transaction may use a CAS type operation to atomically check that there is no current writer and (if not) to update the reader count field 650. In other embodiments, a scalable non-zero indicator (not shown) may be included in an ownership record instead of, or in addition to, a reader count field 650 that represents a specific counter value. In some embodiments, a transaction may update reader count field 650 using a CAS type operation if there is no current writer. FIG. 6D illustrates an ownership record 640, according to another embodiment. In this example, ownership record 640 includes a current/latest writer field 610 and a reader count field 650, such as those described above, and a read ownership array 660. In this example, read ownership array 660 may include one or more entries, each indicating whether a corresponding transaction currently owns the associated memory area for reading. In some embodiments, read ownership array 660 may include entries similar to slots 635a-635n, described above. In such embodiments, each slot may be associated with a particular thread. In other embodiments, read ownership array 660 may include a list of entries, each comprising an identifier of a transaction that currently owns the associated memory area for reading.

Figure 6E:
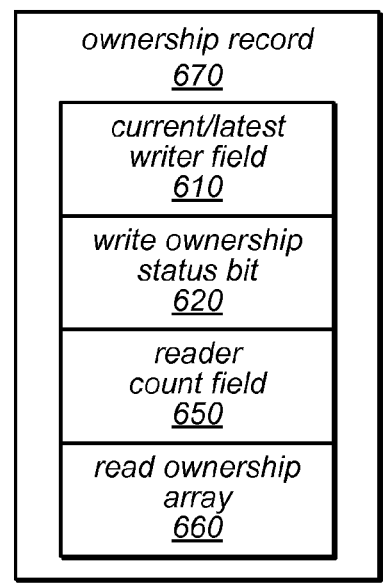

FIG. 6E illustrates an ownership record 670, according to yet another embodiment. In this example, ownership record 670 includes a current/latest writer field 610, a write ownership status bit 620, a reader count field 650, and a read ownership array 650. In various embodiments, these elements of ownership record 670 may be similar to those illustrated in FIGS. 6A-6D, and described above. As previously noted, in other embodiments, more, fewer, or different data structures may be employed in transactional memory systems, and those data structures may include more, fewer, or different fields. For example, in one embodiment, an ownership record may include a field in which a transaction may store an indication that read accesses to the associated memory location(s) will always be implemented as invisible reads or an indication that they will never be implemented as invisible reads.

Figure 7:
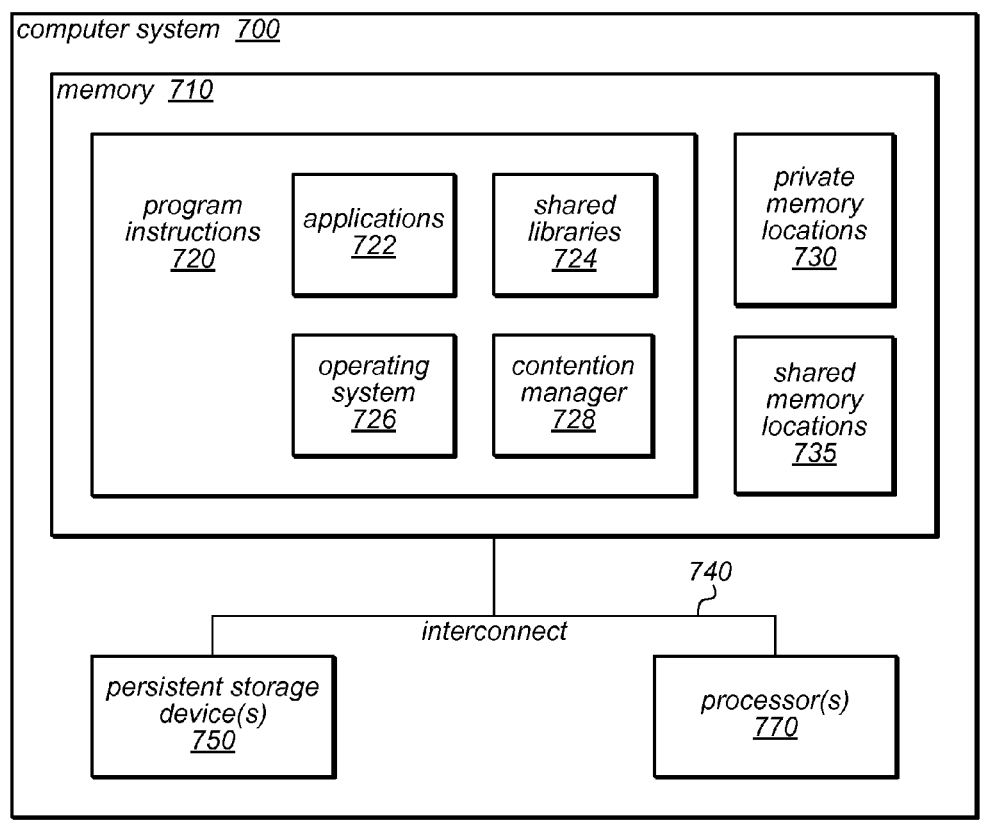
FIG. 7 is a block diagram illustrating a computer system configured to implement a transactional memory, according to various embodiments.

FIG. 7 illustrates a computing system configured to implement the methods described herein, according to various embodiments. The computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for providing transactional memory described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 700 may include one or more processors 770; each may include multiple cores, any of which may be single or multi-threaded. The computer system 700 may also include one or more persistent storage devices 750 (e.g. optical storage, magnetic storage, hard drive, tape drive, solid state memory, etc) and one or more memories 710 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 7 (e.g., video cards, audio cards, additional network interfaces, peripheral devices, a network interface such as an ATM interface, an Ethernet interface, a Frame Relay interface, etc.)

The one or more processors 770, the storage device(s) 750, and the system memory 710 may be coupled to the system interconnect 740. One or more of the system memories 710 may contain program instructions 720. Program instructions 720 may be executable to implement one or more applications 722 (which may include one or more sections of code designated as a user transaction or critical section to be executed atomically), shared libraries 724, operating systems 726, or contention managers 728, as described herein. Program instructions 720 may be encoded in platform native binary, any interpreted language such as Java™ byte-code, or in any other language such as C/C++, Java™, etc or in any combination thereof. The program instructions 720 may include transactional memory support configured to provide functions, operations and/or other processes for implementing software transactional memory that may exploit a hardware transactional memory implemented in the system, as described herein. Such support and functions may exist in one or more of the shared libraries 724, operating systems 726, contention managers 728, or applications 722, in various embodiments. The system memory may further comprise private memory locations 730 and/or shared memory locations 735 where data may be stored. For example, these locations may store data in one or more ownership records, one or more read ownership arrays, a global read-write conflicts counter, one or more data structures configured to store metadata (e.g., snapshots) associated with read access operations (i.e. a read set or invisible reads subset thereof), and/or other data structures accessible to concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of various hybrid transactional memory systems, it should be noted that the techniques and mechanisms disclosed herein may be applicable in other contexts in which transactions are used, including any system that provides both a software transactional memory implementation and a hardware transactional memory implementation for executing atomic transactions that include one or more accesses to a shared memory (e.g., to a transactional memory space accessible to a plurality of concurrently executing transactions). It is intended that the following claims be interpreted to embrace all such variations and modifications.

What is claimed:

1. A method, comprising:
   using a computer to perform:
      executing program instructions comprising user code to be completed as an atomic transaction, wherein the user code comprises one or more memory access operations to a shared memory that is accessible to concurrently executing transactions, wherein said executing comprises:
         a software transactional memory implementing the one or more memory access operations of the user code without acquiring ownership of locations in the shared memory targeted by the one or more memory access operations;
         the software transactional memory capturing at least a portion of a write set of the atomic transaction;

the software transactional memory initiating an attempt to commit the atomic transaction using a hardware transactional memory;

in response to said initiating, the hardware transactional memory performing within a hardware transaction, for at least one entry in the write set of the atomic transaction:

determining whether there are any potential conflicts with another atomic transaction reading or writing a location in the shared memory that is associated with the at least one entry in the write set; and in response to determining that there are not any potential conflicts or in response to addressing any potential conflicts, copying results of write access operations corresponding to the entry to the shared memory; and the hardware transactional memory attempting to commit the hardware transaction.

2. The method of claim 1, wherein said executing further comprises the software transactional memory capturing at least a portion of a read set of the atomic transaction; and wherein the method further comprises, within the hardware transaction, the hardware transactional memory attempting to validate the read set of the atomic transaction.

3. The method of claim 2, wherein said attempting to validate the read set of the atomic transaction comprises:

the hardware transactional memory acquiring ownership of one or more ownership records associated with one or more locations targeted by read access operations of the atomic transaction;

the hardware transactional memory determining whether current contents of the one or more locations targeted by read access operations of the atomic transaction match values previously read from the one or more locations targeted by the read access operations; and the hardware transactional memory determining whether current contents of the one or more ownership records associated with the one or more locations targeted by read access operations match values previously read from the one or more ownership records.

4. The method of claim 2, further comprising using the computer to perform:

in response to the hardware transactional memory failing to validate the read set of the atomic transaction, aborting the hardware transaction.

5. The method of claim 1, wherein said executing further comprises, in response to said initiating, the hardware transactional memory performing within the hardware transaction:

taking a snapshot of a conflict counter prior to said determining whether there are any potential conflicts for the at least one entry in the write set; and wherein said addressing any potential conflicts comprises incrementing the conflict counter.

6. The method of claim 1, wherein said executing further comprises: in response to the hardware transactional memory failing to commit the hardware transaction, retrying the atomic transaction, wherein said retrying comprises the software transactional memory attempting to commit the atomic transaction without use of the hardware transactional memory.

7. The method of claim 1, further comprising using the computer to perform:

determining whether the atomic transaction meets criteria for use of the hardware transactional memory in committing an atomic transaction;

wherein said initiating the attempt to commit the atomic transaction using a hardware transactional memory is performed in response to determining that the atomic transaction meets the criteria for use of the hardware transactional memory.

8. The method of claim 7, wherein the criteria for use of the hardware transactional memory in committing an atomic transaction comprises a maximum number of write set entries that are supported by the hardware transactional memory.

9. The method of claim 1, wherein said executing further comprises:

collecting statistical information pertaining to success or failure of the atomic transaction; and storing the statistical information in memory using non-transactional write operations.

10. A system, comprising:

one or more processors; and a memory coupled to the one or more processors and comprising a shared memory space accessible by transactions concurrently executing on the one or more processors using a transactional memory system implemented in the system that provides both a software transactional memory and a hardware transactional memory;

wherein the memory further comprises program instructions comprising user code to be completed as an atomic transaction, and wherein the user code comprises one or more memory access operations to the shared memory space, wherein the program instructions are executable on the one or more processors to implement:

the software transactional memory implementing the one or more memory access operations of the user code without acquiring ownership of locations in the shared memory space targeted by the one or more memory access operations;

the software transactional memory capturing at least a portion of a write set of the atomic transaction;

the software transactional memory initiating an attempt to commit the atomic transaction using the hardware transactional memory;

in response to said initiating, the hardware transactional memory performing within a hardware transaction, for at least one entry in the write set of the atomic transaction:

determining whether there are any potential conflicts with another atomic transaction reading or writing a location in the shared memory that is associated with the at least one entry in the write set; and in response to determining that there are not any potential conflicts or in response to addressing any potential conflicts, copying results of write access operations corresponding to the entry to the shared memory space; and the hardware transactional memory attempting to commit the hardware transaction.

11. The system of claim 10, wherein the program instructions are further executable on the one or more processors to implement:

the software transactional memory capturing at least a portion of a read set of the atomic transaction; and the hardware transactional memory attempting to validate the read set of the atomic transaction within the hardware transaction.

12. The system of claim 11, wherein said attempting to validate the read set of the atomic transaction comprises:

the hardware transactional memory acquiring ownership of one or more ownership records associated with one or more locations targeted by read access operations of the atomic transaction;

the hardware transactional memory determining whether current contents of the one or more locations targeted by read access operations of the atomic transaction match values previously read from the one or more locations targeted by the read access operations; and the hardware transactional memory determining whether current contents of the one or more ownership records associated with the one or more locations targeted by read access operations match values previously read from the one or more ownership records.

13. The system of claim 11, wherein the program instructions are further executable on the one or more processors to implement: in response to the hardware transactional memory failing to validate the read set of the atomic transaction, aborting the hardware transaction.

14. The system of claim 10,
wherein the program instructions are further executable on the one or more processors to implement, in response to said initiating, the hardware transactional memory performing within the hardware transaction: taking a snapshot of a conflict counter prior to said determining whether there are any potential conflicts for the at least one entry in the write set; and wherein said addressing any potential conflicts comprises incrementing the conflict counter.

15. The system of claim 10, wherein the program instructions are further executable on the one or more processors to implement: in response to the hardware transactional memory failing to commit the hardware transaction, retrying the atomic transaction, wherein said retrying comprises the software transactional memory attempting to commit the atomic transaction without use of the hardware transactional memory.

16. A computer readable storage medium storing program instructions comprising user code to be completed as an atomic transaction, wherein the user code comprises one or more memory access operations to a shared memory that is accessible to concurrently executing transactions, wherein the program instructions are computer-executable to implement:
 a software transactional memory implementing the one or more memory access operations of the user code without acquiring ownership of locations in the shared memory targeted by the one or more memory access operations;
 the software transactional memory capturing at least a portion of a write set of the atomic transaction;
 the software transactional memory initiating an attempt to commit the atomic transaction using a hardware transactional memory;
 in response to said initiating, the hardware transactional memory performing within a hardware transaction, for at least one entry in the write set of the atomic transaction:
  determining whether there are any potential conflicts with another atomic transaction reading or writing a location in the shared memory that is associated with the at least one entry in the write set; and
  in response to determining that there are not any potential conflicts or in response to addressing any potential conflicts, copying results of write access operations corresponding to the entry to the shared memory; and
 the hardware transactional memory attempting to commit the hardware transaction.

17. The storage medium of claim 16, wherein the program instructions are further computer-executable to implement:
 the software transactional memory capturing at least a portion of a read set of the atomic transaction; and
 the hardware transactional memory attempting to validate the read set of the atomic transaction within the hardware transaction.

18. The storage medium of claim 17, wherein said attempting to validate the read set of the atomic transaction comprises:
 the hardware transactional memory acquiring ownership of one or more ownership records associated with one or more locations targeted by read access operations of the atomic transaction;
 the hardware transactional memory determining whether current contents of the one or more locations targeted by read access operations of the atomic transaction match values previously read from the one or more locations targeted by the read access operations; and
 the hardware transactional memory determining whether current contents of the one or more ownership records associated with the one or more locations targeted by read access operations match values previously read from the one or more ownership records.

19. The storage medium of claim 16,
wherein the program instructions are further computer-executable to implement, in response to said initiating, the hardware transactional memory performing within the hardware transaction: taking a snapshot of a conflict counter prior to said determining whether there are any potential conflicts for the at least one entry in the write set; and wherein said addressing any potential conflicts comprises incrementing the conflict counter.

20. The storage medium of claim 16, wherein the program instructions are further computer-executable to implement: in response to the hardware transactional memory failing to commit the hardware transaction, retrying the atomic transaction, wherein said retrying comprises the software transactional memory attempting to commit the atomic transaction without use of the hardware transactional memory.

* * * * *